US012558821B2

(12) United States Patent
Tada et al.

(10) Patent No.: US 12,558,821 B2
(45) Date of Patent: Feb. 24, 2026

(54) DEMOLDING DEVICE

(71) Applicant: KAWASAKI JUKOGYO KABUSHIKI KAISHA, Kobe (JP)

(72) Inventors: Shoji Tada, Kobe (JP); Masaki Takahashi, Kobe (JP); Shimpei Tokuno, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 155 days.

(21) Appl. No.: 18/670,001

(22) Filed: May 21, 2024

(65) Prior Publication Data

US 2024/0300150 A1    Sep. 12, 2024

Related U.S. Application Data

(63) Continuation of application No. PCT/JP2022/046649, filed on Dec. 19, 2022.

(30) Foreign Application Priority Data

Dec. 27, 2021    (JP) ................................. 2021-212596

(51) Int. Cl.
| | |
|---|---|
| *B29C 37/00* | (2006.01) |
| *B29C 33/44* | (2006.01) |
| *B29L 23/00* | (2006.01) |
| *B29L 31/30* | (2006.01) |

(52) U.S. Cl.
CPC ........ *B29C 37/0007* (2013.01); *B29C 33/444* (2013.01); *B29C 37/0014* (2013.01); *B29C 37/0017* (2013.01); *B29L 2023/00* (2013.01); *B29L 2031/3082* (2013.01)

(58) Field of Classification Search
CPC ......... B29L 2031/3082; B29C 37/0007; B29C 37/0014; B29C 37/0017; B29C 33/442; B29C 33/444
See application file for complete search history.

(56) References Cited

U.S. PATENT DOCUMENTS

| | | | |
|---|---|---|---|
| 2015/0059967 A1 | 3/2015 | Fosse et al. | |
| 2019/0317482 A1* | 10/2019 | Stone ................. | G05B 19/4189 |
| 2022/0152880 A1* | 5/2022 | Jones ................... | B29C 33/442 |

* cited by examiner

*Primary Examiner* — John J DeRusso
(74) *Attorney, Agent, or Firm* — XSENSUS LLP

(57) ABSTRACT

A demolding device that removes a thin-walled part from a mold, the thin-walled part being tubular and having a partially open wall, the demolding device including: contour units that are located in a circumferential direction of the thin-walled part and each of which includes a contact structure that contacts an outer surface of the thin-walled part and moves in a thin-walled surface outward direction extending away from the outer surface of the thin-walled part; and a puller that engages with edges of the partially open wall of the thin-walled part and that applies a load to the thin-walled part, the load including a force component acting in the circumferential direction of the thin-walled part. In response to application of the load from the puller to the thin-walled part, each of the contour units moves the contact structure to keep the contact structure in contact with the thin-walled part.

16 Claims, 12 Drawing Sheets

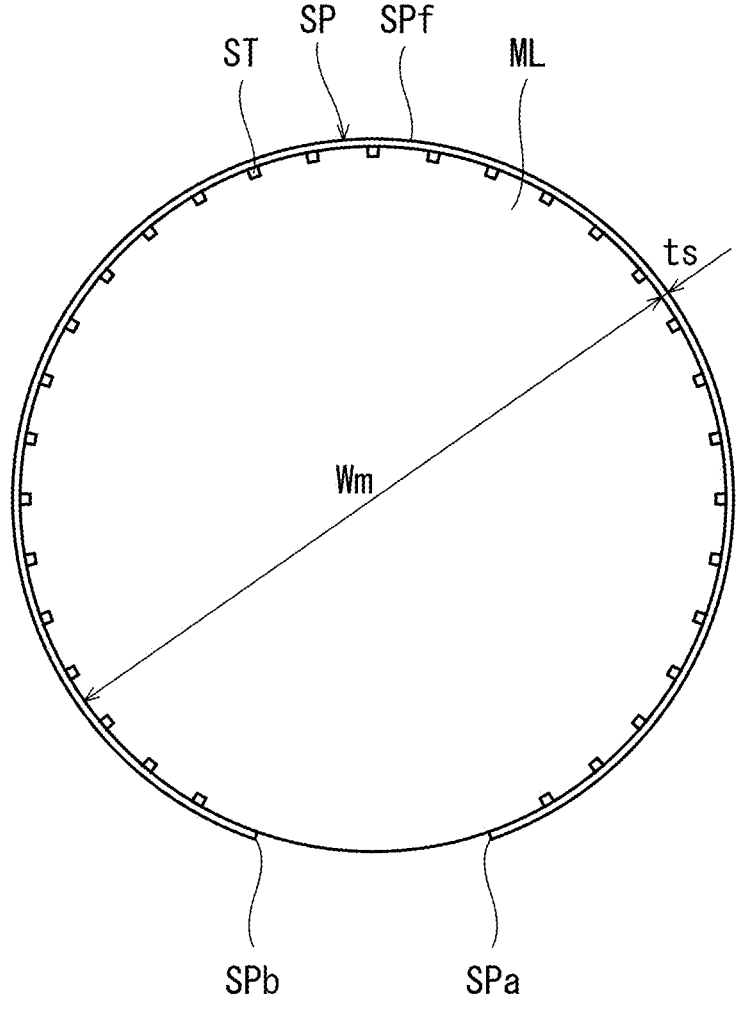
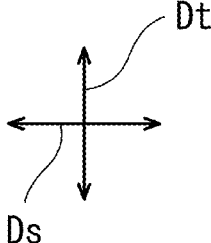
FIG. 2B

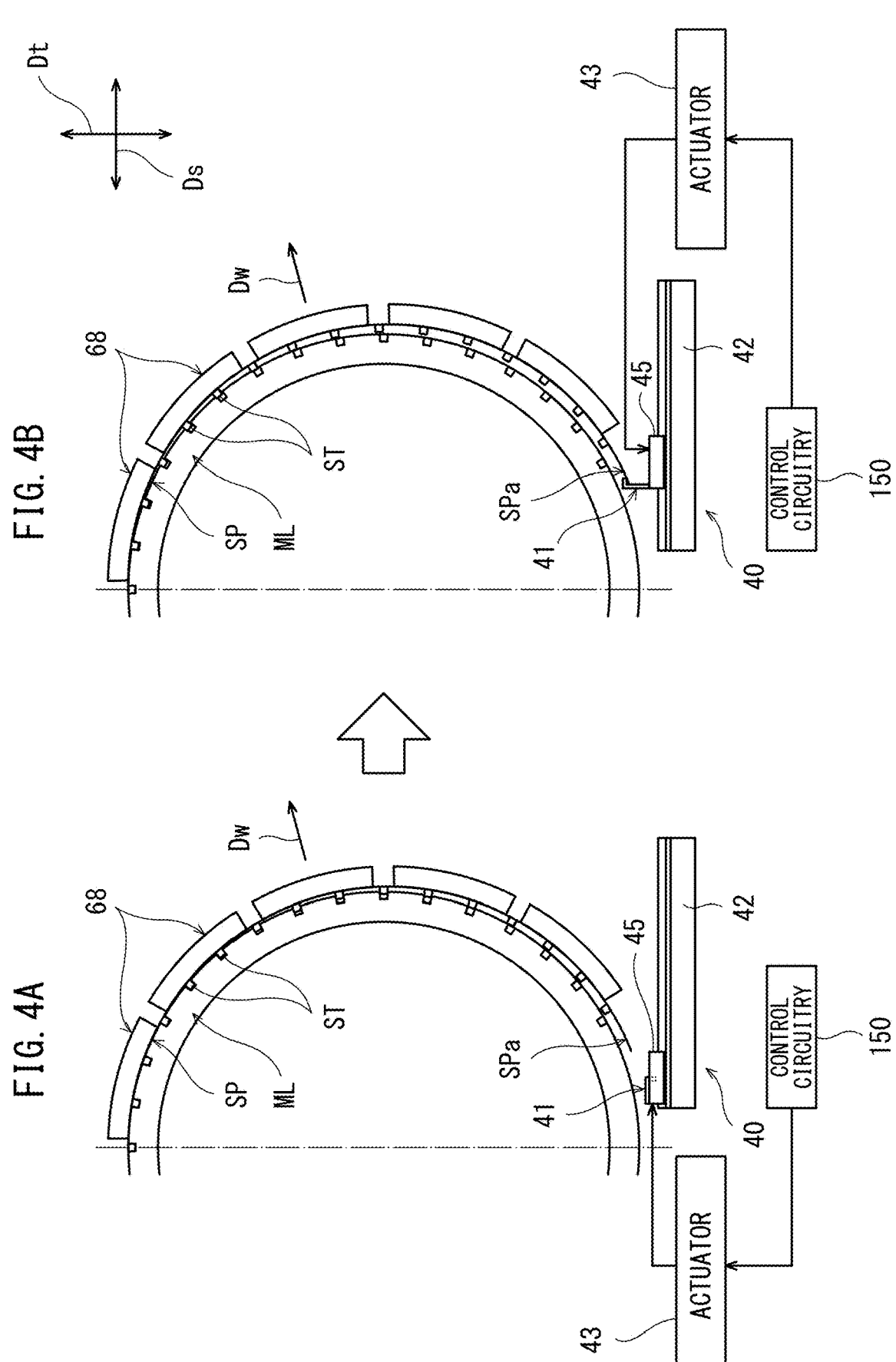

| PULLER | POSITION |
|---|---|
| CONTOUR UNIT 60C | P0 → P1 → P2 |
| CONTOUR UNIT 60D | Q0 → Q1 → Q2 |
| CONTOUR UNIT 60E | Q0 → Q0 → Q1 |
| | Q0 → Q0 → Q0 |

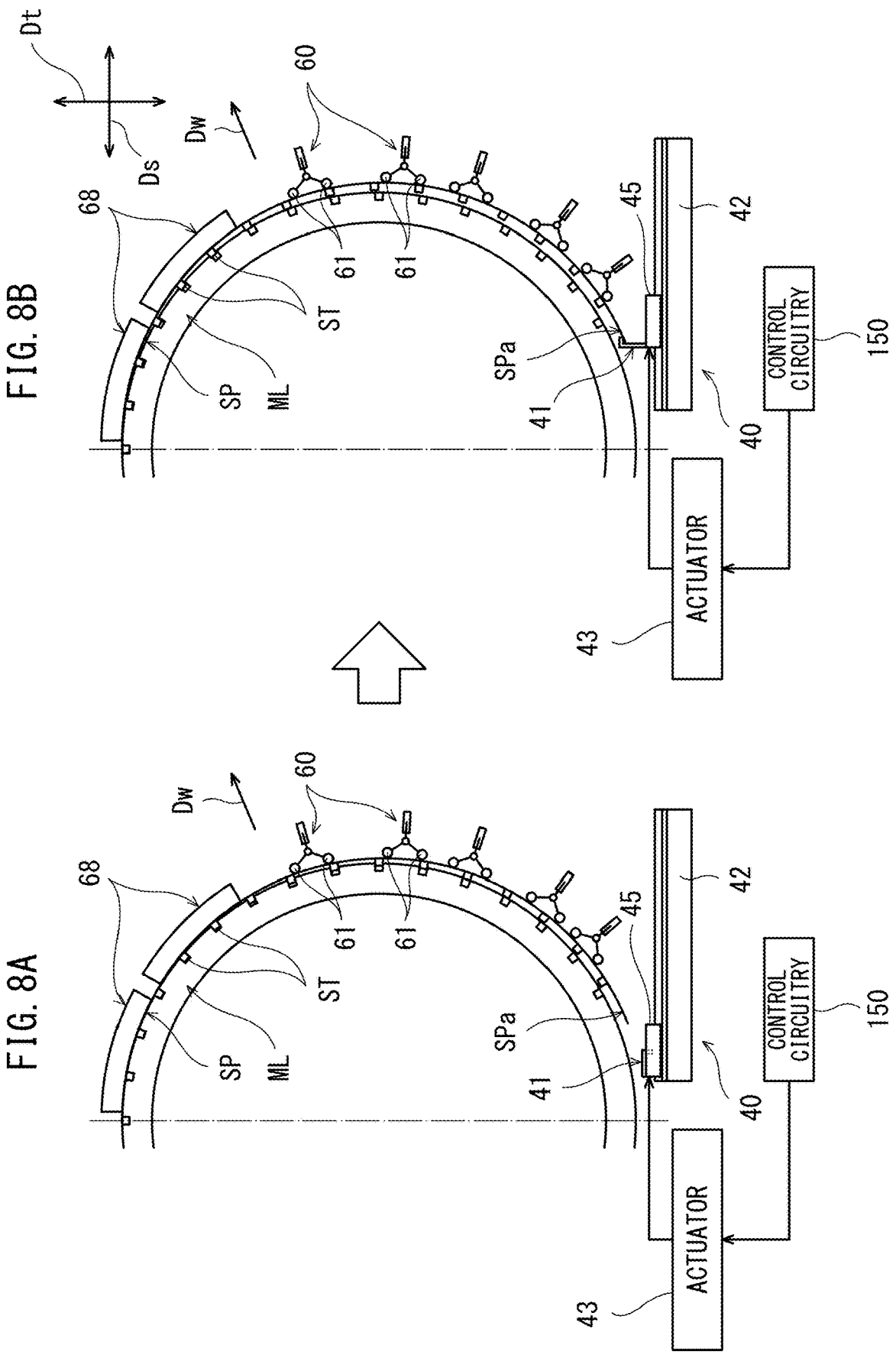

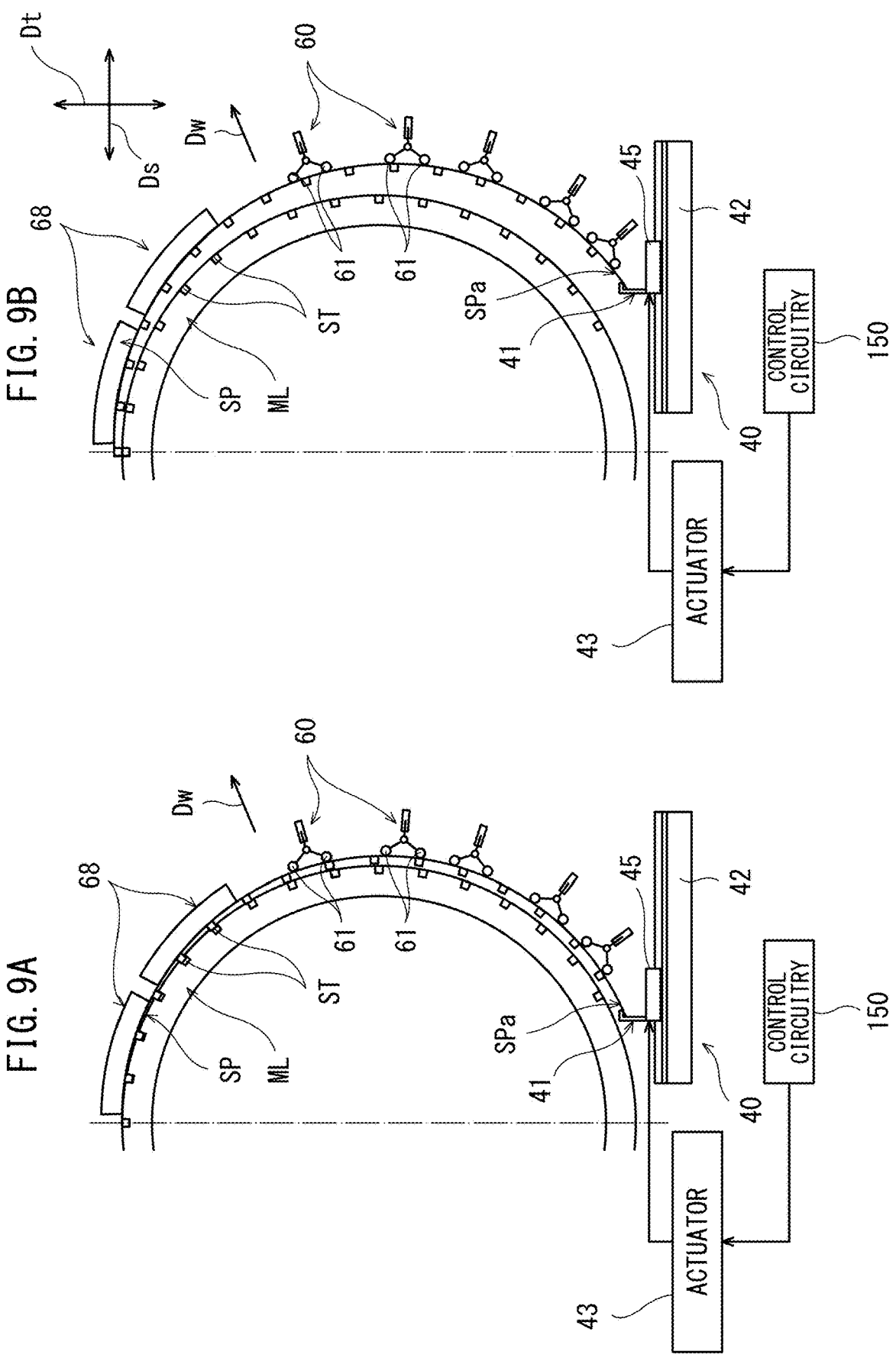

FIG. 10A
FIG. 10B
FIG. 10C
FIG. 10D
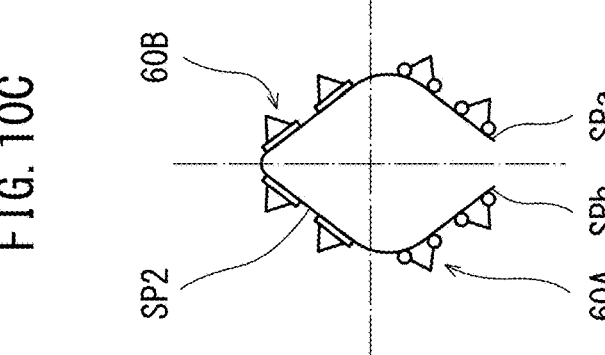
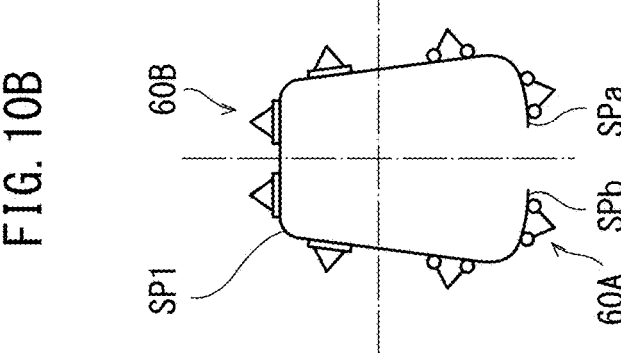
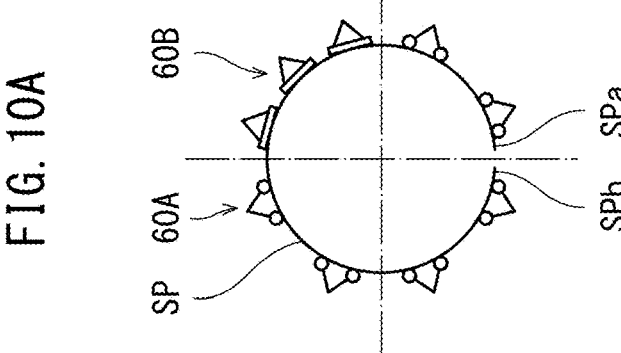

DEMOLDING DEVICE

CROSS-REFERENCE TO RELATED APPLICATIONS

The present application is a bypass continuation of PCT Filing PCT/JP2022/046649, filed Dec. 19, 2022, which claims priority to JP2021-212596, filed Dec. 27, 2021, both of which are incorporated by reference in their entirety.

BACKGROUND ART

1. Field of the Invention

The present disclosure relates to a demolding device that demolds a thin-walled part formed by molding.

2. Description of the Related Art

A method for removing a relatively large thin-walled part such as one for use as an aircraft fuselage from a cylindrical tubular mold or a circular cone-shaped mold is to disassemble the mold and demold the thin-walled part. Another exemplary method uses two edges of a cylindrical tubular skin having a partially open wall to demold the thin-walled part from inside the mold.

In the case where the wall thickness of a thin-walled part is extremely small relative to the diameter of the thin-walled part, the use of the demolding method of the above-mentioned literature could cause a local deformation of the circumferential portion of the thin-walled part.

SUMMARY

A demolding device of the present disclosure is a demolding device that removes a thin-walled part from a mold, the thin-walled part being tubular and having a partially open wall, the demolding device including: contour units that are located in a circumferential direction of the thin-walled part and each of which includes a contact structure that contacts an outer surface of the thin-walled part and moves in a thin-walled surface outward direction extending away from the outer surface of the thin-walled part; and a puller that engages with edges of the partially open wall of the thin-walled part and that applies a load to the thin-walled part, the load including a force component acting in the circumferential direction of the thin-walled part, wherein in response to application of the load from the puller to the thin-walled part, each of the contour units moves the contact structure to keep the contact structure in contact with the thin-walled part.

BRIEF DESCRIPTION OF THE DRAWINGS

FIG. 2B shows the thin-walled part of FIG. 2A as viewed in the axial direction of the thin-walled part.

FIG. 4A shows a puller in an initial position relative to the thin-walled part.

FIG. 4B shows an engager of the puller which is in engagement with a first edge of the thin-walled part.

FIG. 5A shows the first edge of the thin-walled part which is being expanded by the puller.

FIG. 5B shows the thin-walled part which has been demolded.

FIG. 8A shows a puller in an initial position relative to the thin-walled part in another embodiment.

FIG. 8B shows an engager of the puller which is in engagement with the first edge of the thin-walled part in the other embodiment.

FIG. 9A shows the first edge of the thin-walled part which is being expanded rightward by the puller in the other embodiment.

FIG. 9B shows the thin-walled part which has been demolded in the other embodiment.

FIG. 10A is a schematic view showing an example of the arrangement of the contour units.

FIG. 10B is a schematic view showing another example of the arrangement of the contour units.

FIG. 10C is a schematic view showing another example of the arrangement of the contour units.

FIG. 10D is a schematic view showing another example of the arrangement of the contour units.

DETAILED DESCRIPTION

Hereinafter, a demolding device and a demolding method according to the present disclosure will be described with reference to the drawings. The demolding device and the demolding method described below are merely exemplary embodiments. It should be appreciated that the present disclosure is not limited to the embodiments described below.

First Embodiment

Figure 1A:
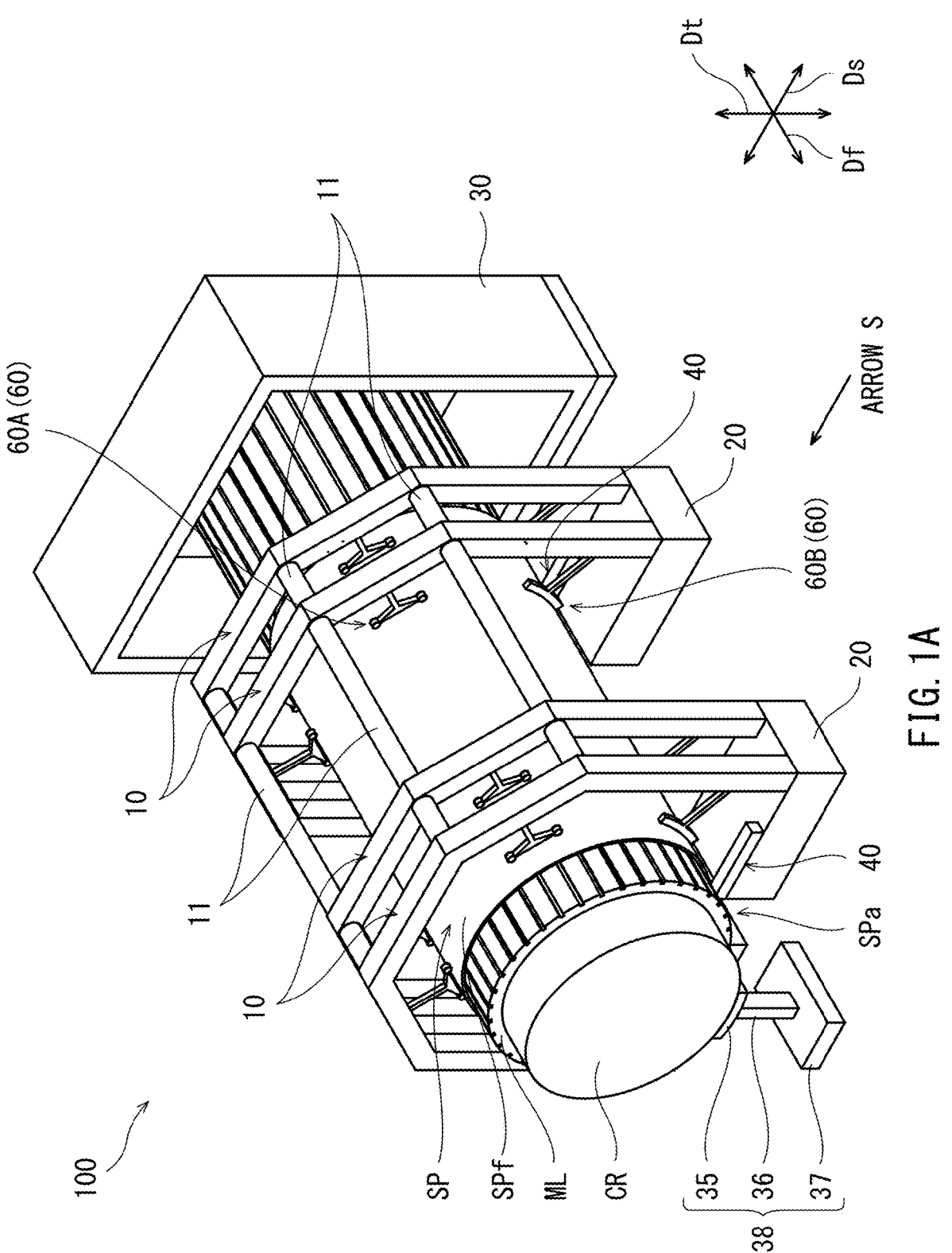
FIG. 1A is an overall perspective view showing the configuration of a demolding device according to the present disclosure.
Figure 1B:
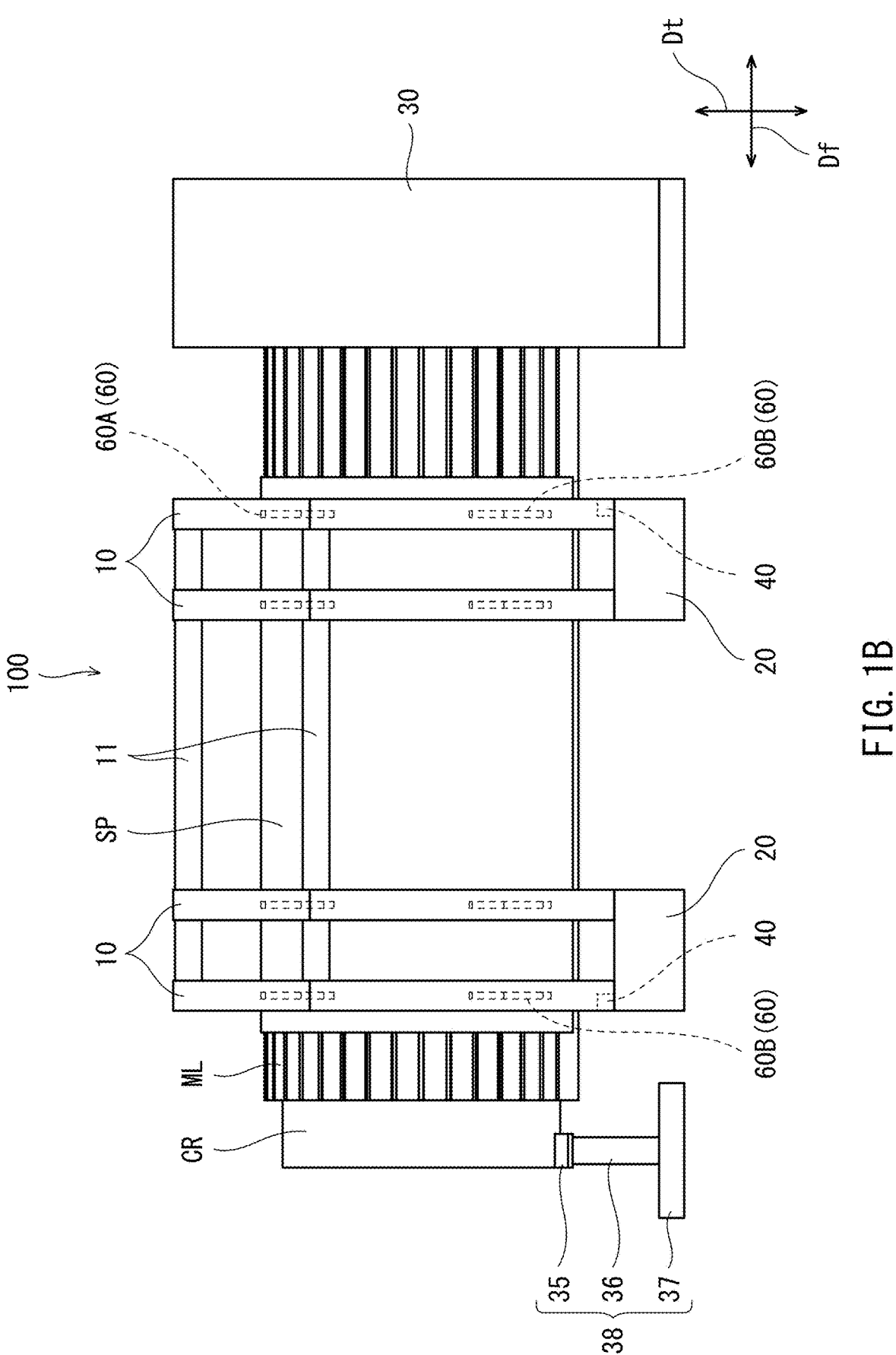
FIG. 1B shows the demolding device as viewed along the arrow S in FIG. 1A.

FIG. 1A is an overall perspective view showing the configuration of a demolding device 100 according to the present disclosure. FIG. 1B shows the demolding device 100 as viewed along the arrow S in FIG. 1A. In the following description, two directions perpendicular to an axial direction Df of a tubular thin-walled part SP to be demolded by the demolding device 100 are referred to as a first perpendicular direction Ds and a second perpendicular direction Dt, respectively. For example, the first perpendicular direction Ds is the width direction of the thin-walled part SP, and the second perpendicular direction Dt is the up-down direction. In the case where the thin-walled part SP is shaped as a cylindrical tube, the first perpendicular direction Ds is the radial direction of the thin-walled part SP.

As shown in FIGS. 1A and 1B, the demolding device 100 is a device that removes the tubular thin-walled part SP having a partially open wall from a mold ML. The demolding device 100 includes outer frames 10, connection structures 11, frame support blocks 20, a mold retainer 30, a mold support block 38, pullers 40, contour units (contour structures) 60, and control circuitry 150.

Four outer frames 10 are aligned in the axial direction Df Two frame support blocks 20 are aligned in the axial direction Df. Two of the four outer frames 10 are supported by one of the frame support blocks 20. The other two of the four outer frames 10 are supported by the other of the frame support blocks 20. One of the two outer frames 10 supported by the one frame support block 20 is at a location corresponding to one end of the thin-walled part SP in the axial direction Df One of the two outer frames 10 supported by the other frame support block 20 is at a location corresponding to the other end of the thin-walled part SP in the axial direction Df.

Each of the outer frames 10 is, for example, U-shaped to open at one end in the second perpendicular direction Dt. The mold ML, with which the thin-walled part SP is in close contact, is located inside the U-shaped openings of the outer frames 10. Each of the outer frames 10 supports contour units 60. Any one of the outer frames 10 and another outer frame 10 adjacent to the one outer frame 10 are coupled by connection structures 11 extending in the axial direction Df. The outer frames 10 are not limited to the configuration described above. The outer frames 10 may be any kind of outer frames that have strength and stiffness sufficient for proper operation of the demolding device 100.

The contour units 60 supported by each outer frame 10 are located in the circumferential direction of the thin-walled part SP. Each of the contour units 60 includes a contact structure 59 that contacts the outer surface SPf of the thin-walled part SP. Each of the contour units 60 supports the contact structure 59, which can move in a thin-walled surface outward direction Dw extending away from the outer surface of the thin-walled part SP. In the present embodiment, the contact structure 59 is either a contour roller 61 or a contour board 68. One of the outer frames 10 is at a location corresponding to one end of the thin-walled part SP in the axial direction Df Thus, the contact structure 59 of the contour unit 60 supported by the one outer frame 10 contacts one end of the outer surface SPf of the thin-walled part SP in the axial direction Df. Another of the outer frames 10 is at a location corresponding to the other end of the thin-walled part SP in the axial direction Df, and the contact structure 59 of the contour unit 60 supported by the other outer frame 10 contacts the other end of the outer surface SPf of the thin-walled part SP in the axial direction Df. Those locations in the axial direction Df at which the contact structures 59 contact the thin-walled part SP are not limited to the axial ends of the outer surface SPf. In response to load application from the pullers 40 to the thin-walled part SP, the contour units 60 move the contact structures 59 to keep the contact structures 59 in contact with the thin-walled part SP.

The mold support block 38 includes a support 35, a support shaft 36 connected to the support 35, and a support base 37 supporting the support shaft 36. The mold support block 38 indirectly supports one end of the mold ML in the axial direction Df. Specifically, a connection ring CR having a smaller diameter than the mold ML is connected to the one end of the mold ML. The support 35 is arc-shaped and supports the connection ring CR. Thus, the one end of the mold ML is indirectly supported by the support 35. The support shaft 36 extends in the second perpendicular direction Dt. In the present embodiment, the dimension of the support shaft 36 in the first perpendicular direction Ds is smaller than the dimension of the opening of the partially open wall of the thin-walled part SP in the first perpendicular direction Ds. This makes it possible to move and withdraw the demolded thin-walled part SP in the axial direction Df without having to detach the mold ML and the mold support block 38 from each other. The connection ring CR and the support 35 of the mold support block 38 may be detachably fastened by means such as bolts.

The mold retainer 30 supports the other end of the mold ML in the axial direction Df. For example, the mold retainer 30 is shaped as a hollow rectangular parallelepiped, and the inner wall of the mold retainer 30 supports the other end of the thin-walled part SP. The mold retainer 30 is not limited to having a particular structure. For example, the mold retainer 30 may have a framework structure made up of frames combined together. The connection between the mold retainer 30 and the other end of the mold ML in the axial direction Df is not limited to using particular means. For example, the mold retainer 30 and the mold ML may be connected by a portion of the frames of the framework structure mentioned above.

The pullers 40 are located in correspondence with the opposite ends of the thin-walled part SP in the axial direction Df Each of the pullers 40 engages with the opposite edges of the opening of the partially open wall of the thin-walled part SP and applies a load including a force component acting in the circumferential direction of the thin-walled part SP. Those locations at which the pullers 40 engage with the thin-walled part SP are not limited to the edges of the thin-walled part SP. For example, the pullers 40 may engage with the vicinities of the edges of the thin-walled part SP to apply loads.

Figure 2A:
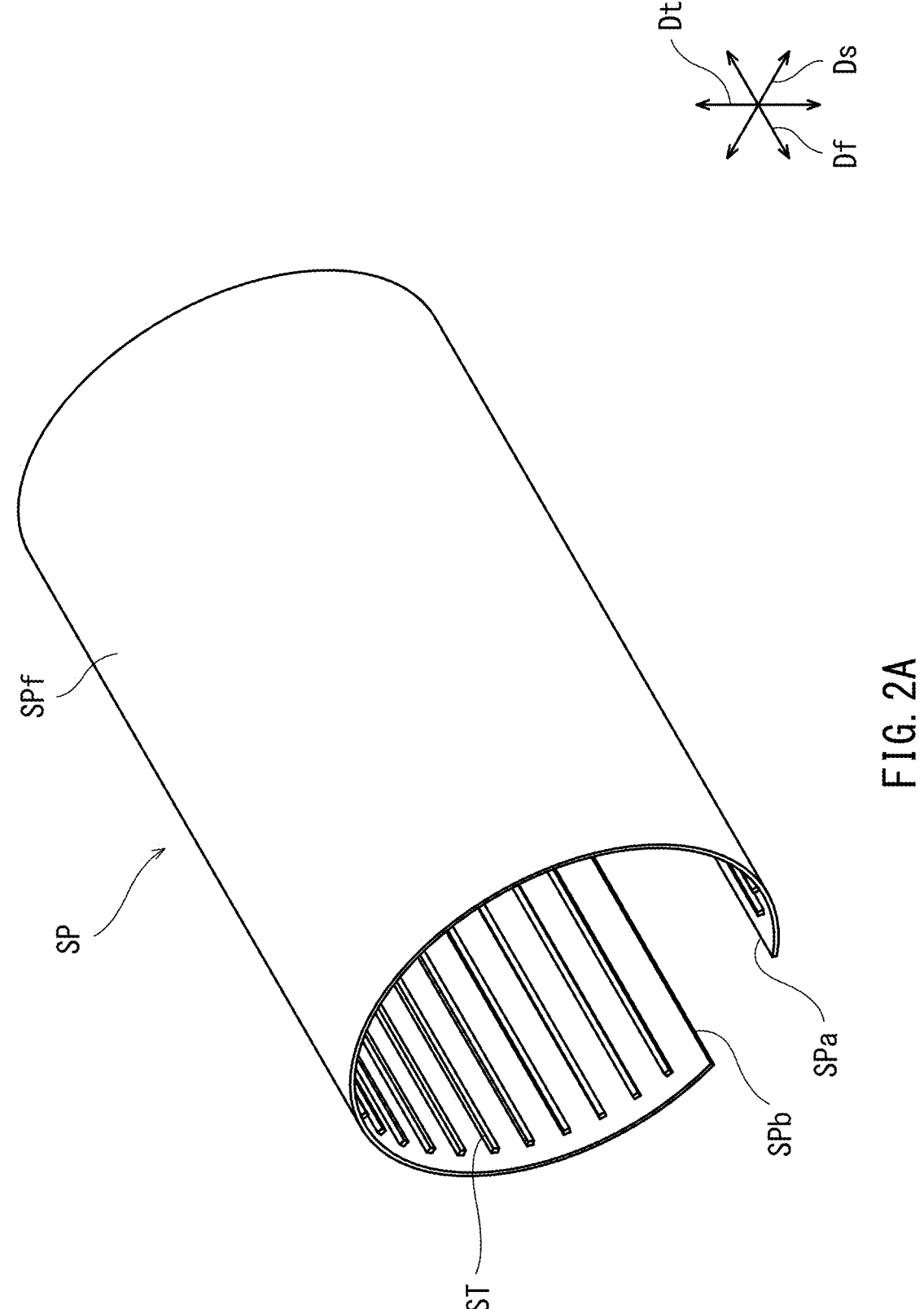
FIG. 2A is a perspective view of a thin-walled part shown in FIG. 1A.

FIG. 2A is a perspective view of the thin-walled part SP of FIG. 1A. FIG. 2B shows the thin-walled part SP of FIG. 2A as viewed in the axial direction Df. The thin-walled part SP is used, for example, as an aircraft fuselage. As shown in FIG. 2A, the thin-walled part SP is shaped as a tube having a partially open wall. The thin-walled part SP includes a first edge SPa and a second edge SPb. The first edge SPa and the second edge SPb are the edges of the opening of the partially open wall of the thin-walled part SP. The first edge SPa and the second edge SPb are opposite to each other in the first perpendicular direction Ds. The thin-walled part SP includes stringers ST joined to the inner surface of the thin-walled part Sp. As shown in FIG. 2B, the wall thickness ts of the thin-walled part SP is, for example, from $\frac{1}{3500}$ to $\frac{1}{200}$ of the maximum width Wm of the hollow interior of the thin-walled part SP on the outer circumference of the mold. The thin-walled part SP may include another opening for a window or door. In FIG. 2A, such an opening for a window or door in the thin-walled part SP is omitted.

Figure 3A:
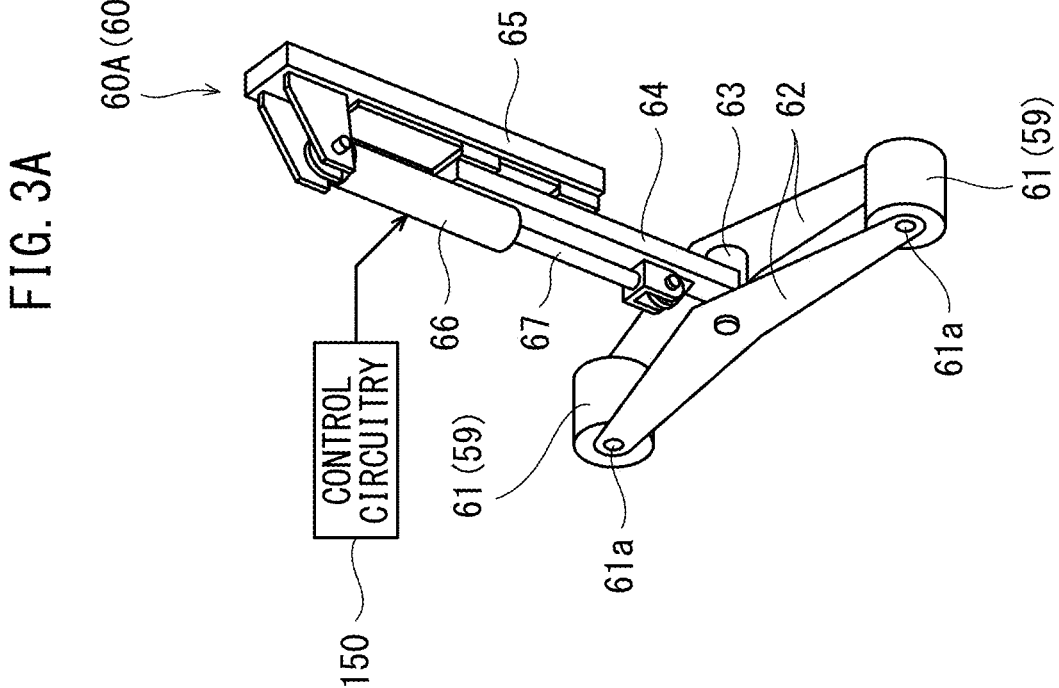
FIG. 3A is a perspective view showing the configuration of a contour unit.
Figure 3B:
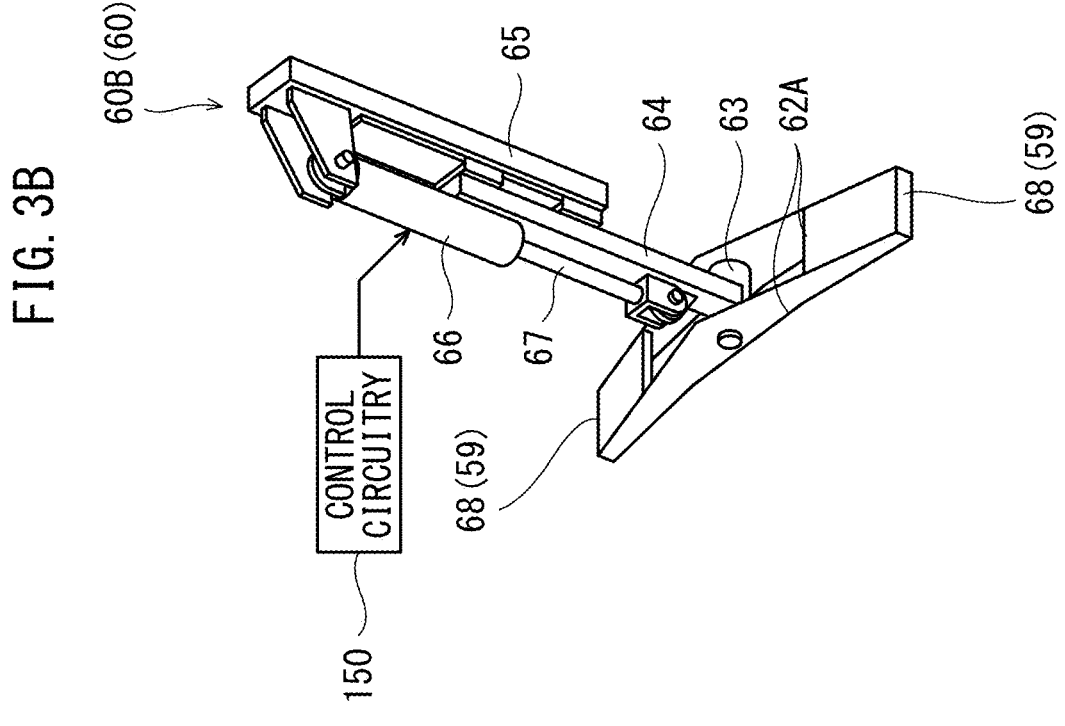
FIG. 3B is a perspective view showing the configuration of another contour unit.

The following will describe the contour units 60. In the present embodiment, contour units 60A or contour units 60B may be used as the contour units 60. FIG. 3A is a perspective view showing the configuration of the contour unit 60A. FIG. 3B is a perspective view showing the configuration of the contour unit 60B. There is no limitation on which of the contour units 60 located in the circumferential direction of the thin-walled part SP are the contour units 60A or 60B. Hereinafter, the configurations of the contour units 60A and 60B will be described with reference to the drawings.

The contour unit 60A of FIG. 3A includes a pair of contour rollers 61 which are an example of the contact structures 59, a pair of arms 62, a coupler 63, a slider 64, a base 65, and a cylinder 66 including a piston 67. The control circuitry 150 controls the operation of the cylinder 66.

One of the contour rollers 61 includes a rotatable axle 61a, which is rotatably supported by one end of one of the arms 62 and one end of the other arm 62. Likewise, the other contour roller 61 includes a rotatable axle 61a, which is rotatably supported by the other end of the one arm 62 and the other end of the other arm 62.

The coupler 63 couples the longitudinal center of the one arm 62 to the longitudinal center of the other arm 62. The distal end of the slider 64 is connected to the coupler 63. The slider 64 is connected to the base 65 and moves in the thin-walled surface outward direction Dw. To the slider 64 is secured the distal end of the piston 67. In this configuration, the control circuitry 150 controls the cylinder 66 to move the piston 67 in the thin-walled surface outward direction Dw, and in conjunction with this movement the pair of contour rollers 61 move in the thin-walled surface outward direction Dw. The cylinder 66 may be any actuator that moves the piston 67 in the thin-walled surface outward direction Dw. For example, the cylinder 66 may be a hydraulic cylinder or a pneumatic cylinder.

The contour unit 60B of FIG. 3B has substantially the same configuration as the contour unit 60A of FIG. 3A. The components of the contour unit 60B that are identical to components of the contour unit 60A are denoted by the same reference signs as the components of the contour unit 60A.

The contour unit 60B includes a pair of contour boards 68 and a pair of arms 62A instead of the contour rollers 61, arms 62, and rotatable axles 61a of the contour unit 60A. One of the contour boards 68 is connected between one end of one of the arms 62A and one end of the other arm 62A. The other contour board 68 is connected between the other end of the one arm 62A and the other end of the other arm 62A. The control circuitry 150 controls the cylinder 66 to move the piston 67 in the thin-walled surface outward direction Dw, and in conjunction with this movement the pair of contour boards 68 move in the thin-walled surface outward direction Dw.

Figures 5A, 5B:
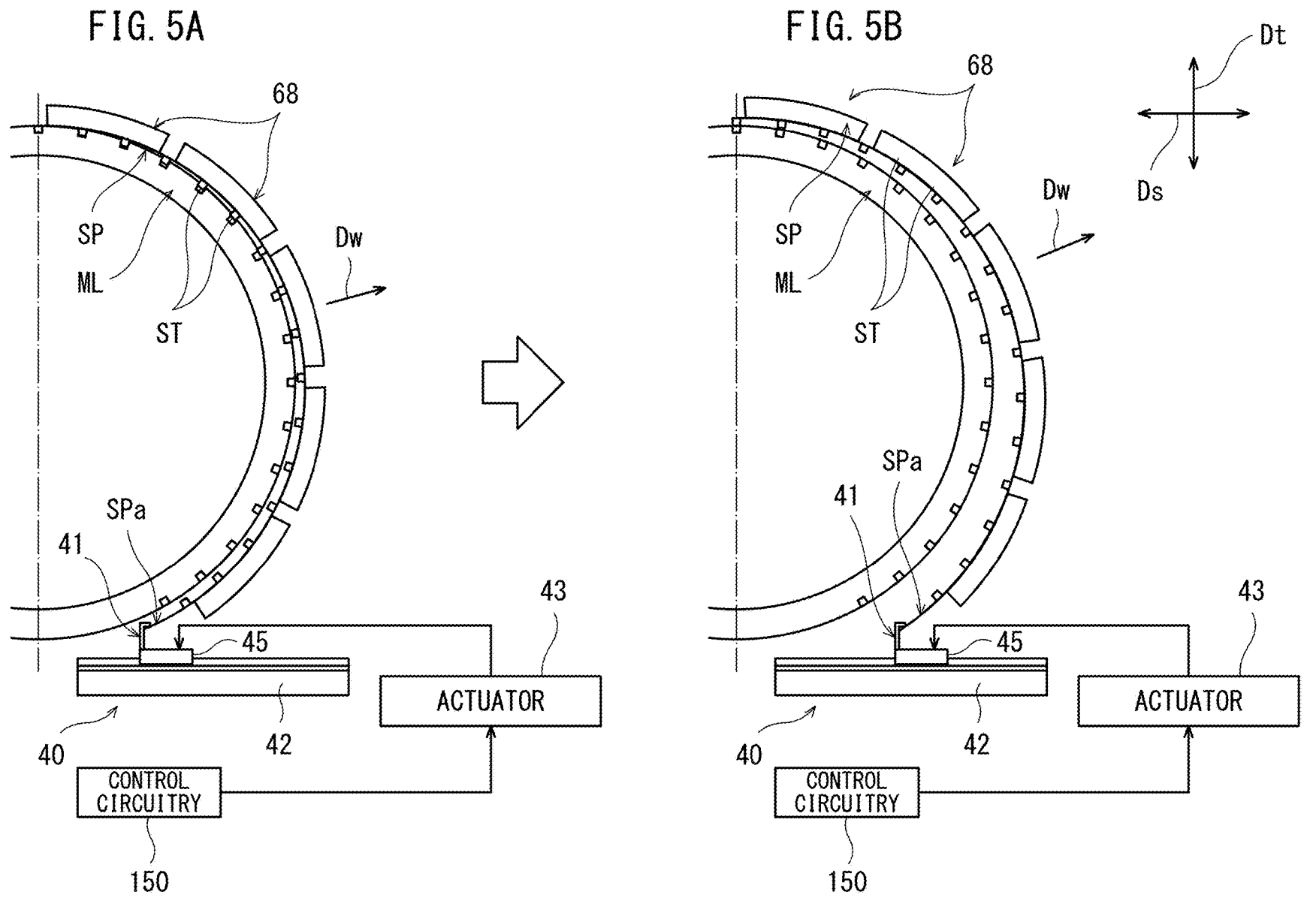

A method for demolding the thin-walled part SP will be described with reference to the drawings. FIG. 4A shows the puller 40 in an initial position relative to the thin-walled part SP. FIG. 4B shows an engager 41 of the puller 40 which is in engagement with the first edge SPa of the thin-walled part SP. FIG. 5A shows the first edge SPa of the thin-walled part SP which is being expanded outward by the puller 40. FIG. 5B shows the thin-walled part SP which has been demolded. The example illustrated in FIGS. 4A to 5B is one in which the contour units 60B as shown in FIG. 3B are used as the contour units 60. In FIGS. 4A to 5B, only one half of the thin-walled part SP in the first perpendicular direction Ds is depicted for convenience of illustration. In reality, the other half of the thin-walled part SP, which is not shown in the figures, is demolded in the same manner as the one half of the thin-walled part SP.

As shown in FIGS. 4A to 5B, the puller 40 includes a pair of engagers 41 and an actuator 43. The engagers 41 engage with the first edge SPa and the second edge SPb of the thin-walled part SP, respectively. The actuator 43 moves the engagers 41. The actuator 43 is, for example, a hydraulic cylinder. The control circuitry 150 controls the operation of the actuator 43.

As shown in FIG. 4A, the thin-walled part SP formed by molding is initially supported in close contact with the mold ML. In this stage, the puller 40 is away from the first edge SPa of the thin-walled part SP.

Next, the actuator 43 is operated to move a slider 45 supporting the engager 41 outward in the first perpendicular direction Ds. Thus, as shown in FIG. 4B, the engager 41 engages with the first edge SPa of the thin-walled part SP. The manner in which the puller 40 engages with the thin-walled part SP is not limited to that described above.

Next, as shown in FIG. 5A, the actuator 43 moves the slider 45 further outward in the first perpendicular direction Ds. Thus, the first edge SPa of the thin-walled part SP expands outward in the first perpendicular direction Ds. Meanwhile, the contour units 60 are subjected to position change control by the control circuitry 150. Thus, the contour boards 68 of the contour units 60 are moved in the thin-walled surface outward direction Dw.

From the state of FIG. 5A, the actuator moves the slider 45 further outward in the first perpendicular direction Ds. Meanwhile, as shown in FIG. 5B, the control circuitry 150 moves the contour boards 68 are further in the thin-walled surface outward direction. The above operations are repeated until the thin-walled part SP is completely removed from the mold ML.

The control circuitry 150 controls the contour units 60 to change the position of. Specifically, under control of the control circuitry 150, the contact structures 59 of the contour units 60 are moved in a direction extending outward from the wall of the thin-walled part SP along with the progress of demolding. The demolding device 100 effects the movement of the slider 45 in conjunction with the movement of the contact structures 59 of the contour units, thus keeping the contact structures 59 in contact with the outer surface SPf while performing the demolding process. The contact structures 59 of the contour units 60, which are in contact with the outer surface SPf of the thin-walled part SP, slide in the circumferential direction of the thin-walled part SP and at the same time move in the direction extending outward from the wall of the thin-walled part SP. Specifically, the positions to which the contour rollers 61 or contour boards 68 are to be moved every time the slider 45 of the puller 40 moves the engager 41 are uniquely defined in association with the position to which the engager 41 is moved. The following is a detailed description of an example where the contour units 60B including the contour boards 68 are used as the contour units 60.

Figures 6A, 6B:
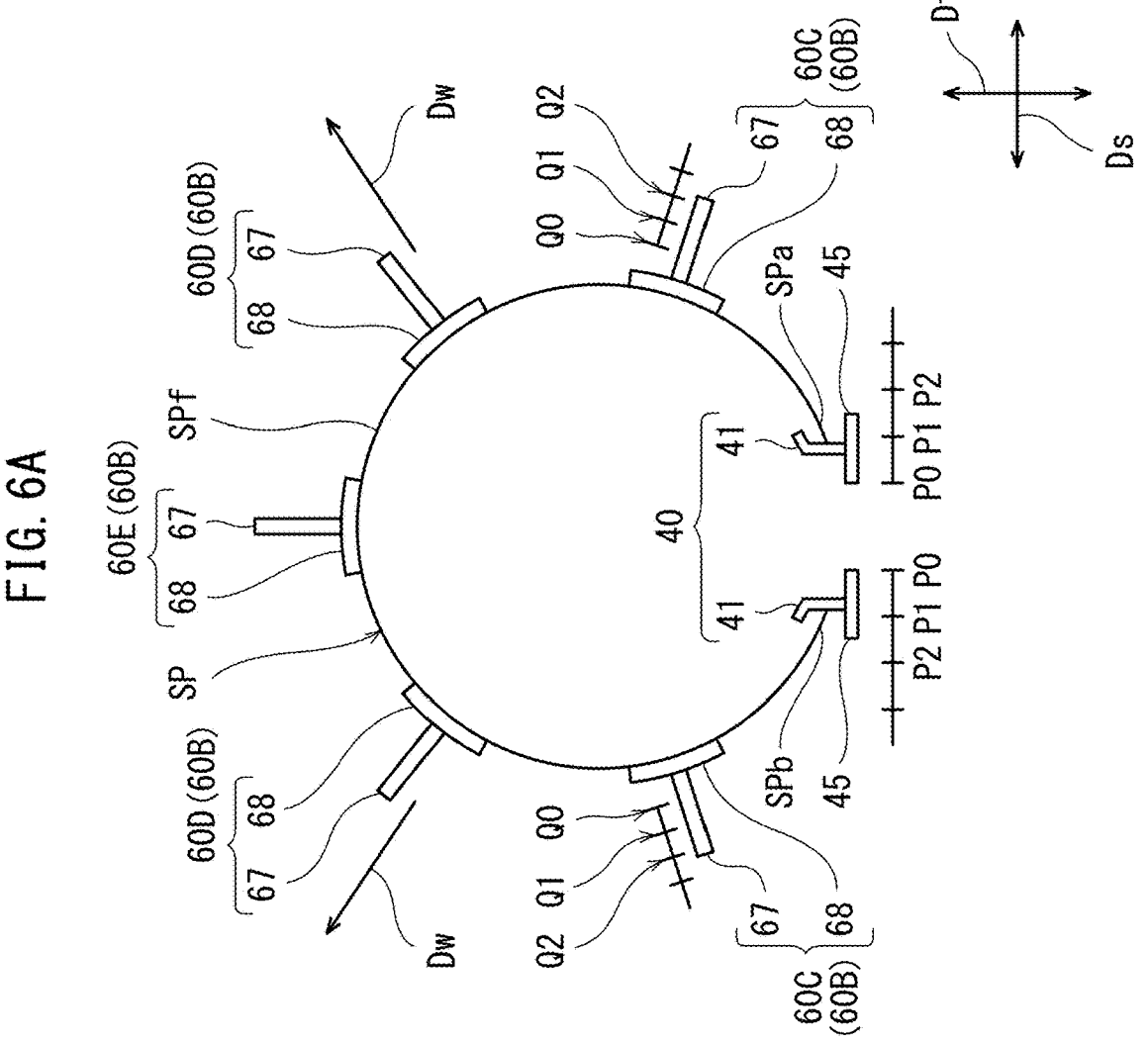
FIG. 6A is a view for explaining position change control of contour units.
FIG. 6B shows positions that the contour units subjected to the position change control of FIG. 6A take in accordance with the position of the puller.

FIG. 6A shows an example where five contour units 60B are located on the circumference of the thin-walled part SP. Each of the five contour units 60B is denoted by the reference sign 60E, 60C, or 60D to differentiate the contour units from one another in the following description. The contour unit 60E is located diametrically opposite to the opening of the partially open wall of the thin-walled part SP. The two contour units 60D are located symmetrically with respect to the contour unit 60E in the first perpendicular direction Ds, and the other contour units 60C are located symmetrically with respect to the contour unit 60E in the first perpendicular direction Ds.

Several positions are predefined for the puller 40 and for each of the contour units 60B. Four positions P0, P1, P2, and P3 are defined for each slider 45. Likewise, four positions Q0, Q1, Q2, and Q3 are defined for the piston 67 of each of the contour units 60C, 60D, and 60E. The position P0 is the initial position of the slider 45. The position Q0 is the initial position of the piston 67. When each slider 45 of the puller 40 is in the position P0, one of the engagers 41 is in engagement with the first edge SPa of the thin-walled part SP and the other engager 41 is in engagement with the second edge SPb. When the piston 67 of each contour unit 60C, 60D, or 60E is in the position Q0, the contour board 68 of each contour unit 60C, 60D, or 60E is in surface contact with the outer surface SPf of the thin-walled part SP.

When each slider 45 of the puller 40 moves from the position P0 to the position P3 in sequence, the piston 67 of each contour unit 60C, 60D, or 60E takes a position in accordance with the position of the slider 45. Specifically, as shown in FIG. 6B, when each slider 45 of the puller 40 moves from the position P0 to the position P1, the piston 67 of each contour unit 60C moves to the position Q1, and the pistons 67 of the contour units 60D and 60E remain in the position Q0. The position information shown in FIG. 6B which specifies the positions of the contour units 60C, 60D, and 60E in association with the different positions of the puller 40 is stored, for example, in a memory.

Subsequently, when each slider 45 of the puller 40 moves from the position P1 to the position P2, the piston 67 of each contour unit 60C moves from the position Q1 to the position Q2. Meanwhile, the piston 67 of each contour unit 60D moves from the position Q0 to the position Q1. The piston 67 of the contour unit 60E remains in the position Q0. In this way, the pistons 67 of the contour units 60B move in accordance with the extent to which the thin-walled part SP expands along with the progress of demolding. The three positions P0 to P2 and the three positions Q0 to Q2 are merely examples, and the number of the positions may be freely chosen. The sliders 45 of the puller 40 and the pistons 67 of the contour units 60B may be moved continuously.

As described above, the control circuitry 150 controls the amount of movement of the contact structure 59 of each of the contour units 60B based on the memory-stored position information specifying the position of each contour unit 60B in association with the position of the puller 40. The memory may be included in the demolding device 100 separately from the control circuitry 150. The movement of each slider 45 of the puller 40 and the movement of the piston 67 of each contour unit 60B may be effected by means of gears or rods.

Figure 7:
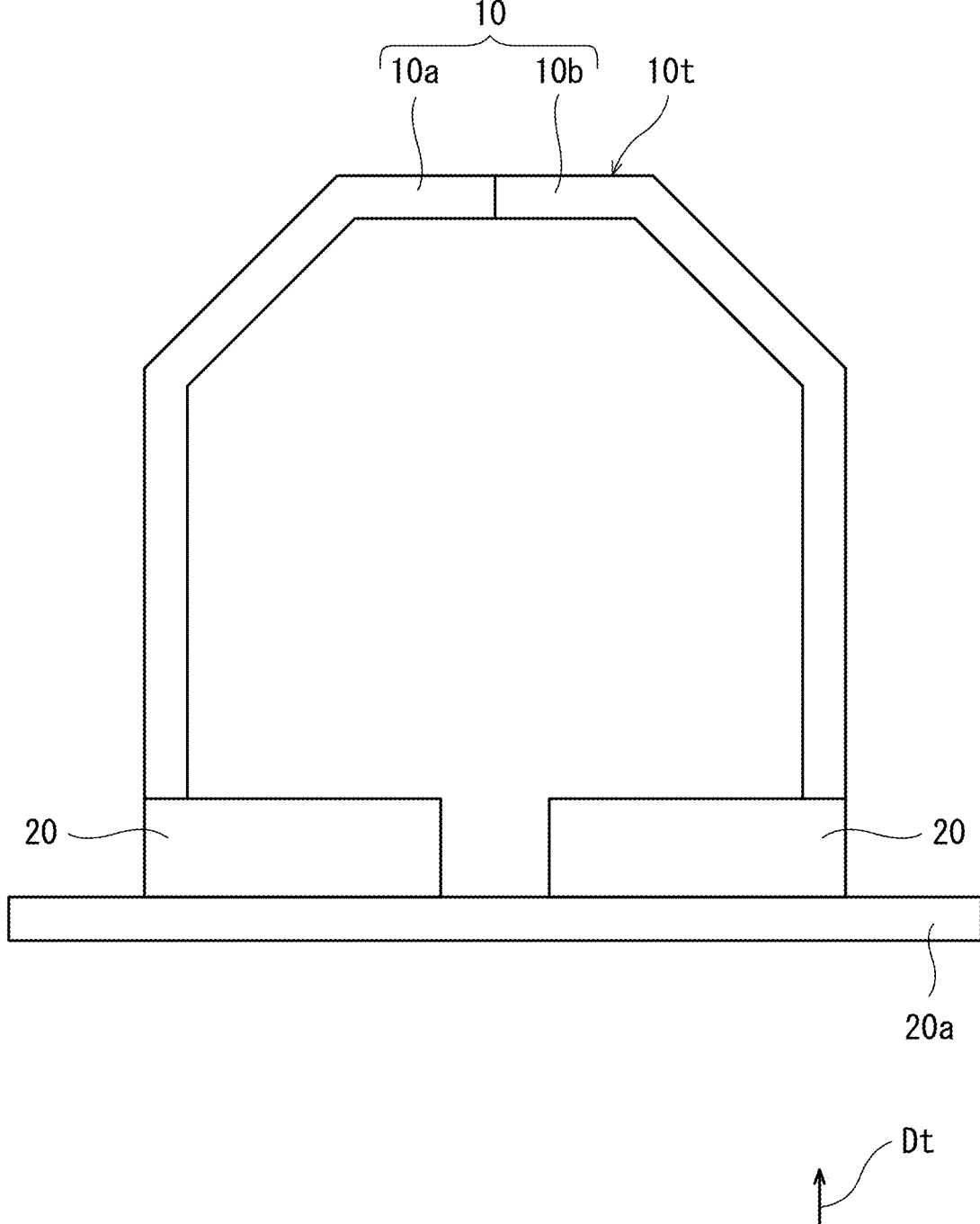
FIG. 7 shows a divisible outer frame.

The outer frames 10 may be divisible frames. FIG. 7 shows a divisible outer frame 10. As shown in FIG. 7, the outer frame 10 includes a top portion 10*t* at one end in the second perpendicular direction Dt. The top portion 10*t* can be divided into a first portion 10*a* and a second portion 10*b* in the first perpendicular direction Ds. A frame support block 20 for the first portion 10*a* and another frame support block 20 for the second portion 10*b* are aligned in the first perpendicular direction Ds. Each of the frame support blocks 20 slides on a base 20*a* in the first perpendicular direction Ds. The division of the outer frame 10 into the first portion 10*a* and the second portion 10*b* makes handling of the outer frame 10 easy. The first portion 10*a* and the second portion 10*b* may be coupled, for example, by using a connector that extends on both the first portion 10*a* and the second portion 10*b* and fastening the connector to the first portion 10*a* and the second portion 10*b* by means such as bolts.

Second Embodiment

As shown in FIGS. 8A to 9B, the contour boards 68 of the contour units 60B may be used for one end region of the thin-walled part SP in the second perpendicular direction Dt, and the contour rollers 61 of the contour units 60A may be used for the middle and lower regions of the thin-walled part SP in the second perpendicular direction Dt. When the thin-walled part SP is subjected to a pressure arising from the engagement of the engagers 41 of the puller 40, the one end region of the thin-walled part SP is more resistant to deformation than the other end region of the thin-walled part SP and, on the one end region, unidirectional movement in the second perpendicular direction Dt away from the one end region is dominant over movement in the circumferential direction of the thin-walled part SP. The contour boards 68 are suitable for use on such a region where the unidirectional movement is dominant.

When the thin-walled part SP is subjected to a pressure arising from the engagement of the engagers 41 of the puller 40, sliding movement in the circumferential direction of the thin-walled part SP is more dominant on the middle region and the other end region of the thin-walled part SP than on the one end region. The contour rollers 61, which are more able to follow the motion of the thin-walled part SP than the contour boards 68, are suitable for use on the regions where the sliding movement is dominant. The step shown in FIG. 8A is the same as the step of FIG. 4A, the step shown in FIG. 8B is the same as the step of FIG. 4B, the step shown in FIG. 9A is the same as the step of FIG. 5A, and the step shown in FIG. 9B is the same as the step of FIG. 5B.

As described above, the contour units 60A and 60B are configured to effect the sliding of the contact structures 59 on the thin-walled part SP by means of rotation of rollers or sliding of plates. The contour units 60A and 60B are not limited to the configurations described above and may have any configurations in which the sliding of the contact structures 59 is effected by means of rotation of rollers or sliding of plates. For example, the contour unit 60A may include two or more contour rollers 61 or one contour roller 61. For example, the contour unit 60B may include two or more contour boards 68 or one contour board 68. However, in the case where the contour units 60A are configured as described above and their contour rollers 61 are arranged in the circumferential direction of the thin-walled part SP, a load can be applied distributively over the outer surface SPf of the thin-walled part SP. This can reliably prevent local deformation of the thin-walled part SP. For the same reason, the contour unit 60B preferably includes two or more contour boards 68 or includes a contour board 68 shaped to extend in the circumferential direction of the thin-walled part SP.

(Variants)

The present disclosure is not limited to the above embodiments, and various modifications as described below may be made without departing from the gist of the present disclosure.

As shown in FIG. 10A, the contour units 60B may be used for a region of the circumference of the thin-walled part SP having a cross-section generally in the shape of a true circle, and the contour units 60A may be used for the rest of the circumference of the thin-walled part SP. As shown in FIG. 10B, the thin-walled part may be a thin-walled part SP1 having a cross-section generally in the shape of a rectangle. When the thin-walled part SP1 is viewed as divided into two portions in the second perpendicular direction Dt, the contour units 60B may be used for one of the two portions, and the contour units 60A may be used for the other of the two portions. As shown in FIG. 10C, the thin-walled part may be a thin-walled part SP2 having a cross-section generally in the shape of a rhombus. When the thin-walled part SP2 is viewed as divided into two portions in the second perpendicular direction Dt, the contour units 60B may be used for one of the two portions, and the contour units 60A may be used for the other of the two portions. As shown in FIG. 10D, the thin-walled part may be a thin-walled part SP3 having a cross-section generally in the shape of an ellipse, and the contour units 60A may be used for the entire circumference of the thin-walled part SP3.

Although in FIG. 2B the first and second edges SPa and SPb of the thin-walled part SP are located at one end in the second perpendicular direction Dt, the present disclosure is not limited to this location of the first and second edges SPa and SPb. For example, the thin-walled part SP having the first and second edges SPa and SPb at the other end in the second perpendicular direction Dt or the thin-walled part SP having the first and second edges SPa and SPb at either end in the first perpendicular direction Ds can also be demolded by the demolding device 100.

Although in the above embodiments two pullers 40 are located in the axial direction Df of the thin-walled part SP, the present disclosure is not limited to this puller arrangement. Three or more pullers 40 may be located in the axial direction Df.

Although in the above embodiments the thin-walled part SP to be demolded is one used as, for example, an aircraft fuselage, the present disclosure is not limited to this kind of thin-walled part SP. The demolding device 100 can demold the thin-walled part SP that is used, for example, as a nose or nacelle of an aircraft or as a fairing of a flying object.

In the above embodiments, whether demolding of the thin-walled part SP has been completed may be determined based on values detected by load cells located on the engagers 41 of the pullers 40 or may be confirmed visually.

The configuration for implementing the control by the control circuitry 150 is not limited to that illustrated above. The functionality of the elements disclosed herein may be implemented using circuitry or processing circuitry which includes general purpose processors, special purpose processors, integrated circuits, ASICs (Application Specific Integrated Circuits), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

A demolding device of the present disclosure is a demolding device that removes a thin-walled part from a mold, the thin-walled part being tubular and having a partially open wall, the demolding device including: contour units that are located in a circumferential direction of the thin-walled part and each of which includes a contact structure that contacts an outer surface of the thin-walled part and moves in a thin-walled surface outward direction extending away from the outer surface of the thin-walled part; and a puller that engages with edges of the partially open wall of the thin-walled part and that applies a load to the thin-walled part, the load including a force component acting in the circumferential direction of the thin-walled part, wherein in response to application of the load from the puller to the thin-walled part, each of the contour units moves the contact structure to keep the contact structure in contact with the thin-walled part.

According to the present disclosure, when the puller applies the load including a force component acting in the circumferential direction to the thin-walled part, the contact structure of each of the contour units follows the motion of the thin-walled part expanded outward by the applied load and maintains contact with the thin-walled part. This can prevent the thin-walled part from deforming due to the application of the load from the puller to the thin-walled part. Unlike in a conventional method where formation of a tubular part by thermal molding is followed by withdrawing the mold in the axial direction of the part, proper demolding can be accomplished even when the wall thickness of the tubular part varies in the axial direction or when an additional projecting part is located on a region of the inner wall surface of the tubular part.

In the above disclosure, the edges of the partially open wall of the thin-walled part may include a first edge and a second edge that are opposite to each other in a horizontal direction, the puller may include a pair of engagers that engage with the first edge and the second edge of the thin-walled part, and an actuator that moves the engagers, and the puller may move the engagers by operation of the actuator to apply the load to the thin-walled part.

According to the above disclosure, the load application to the thin-walled part is effected by the at least one pair of engagers moving in engagement with the first and second edges of the thin-walled part. Thus, the load including a force component acting in the circumferential direction of the thin-walled part can easily be applied to the thin-walled part.

In the above disclosure, the demolding device may further include control circuitry that controls the puller and the contour units, and the control circuitry may control an amount of movement of the contact structure of each of the contour units in conjunction with application of the load from the puller to the thin-walled part.

According to the above disclosure, the contact structure of each of the contour units can be moved to follow the motion of the thin-walled part expanded by application of the load including a force component acting in the circumferential direction to the first and second edges of the thin-walled part. This ensures the prevention of deformation of the thin-walled part.

In the above disclosure, the demolding device may further include a memory storing position information specifying positions of the contour units in association with a position of the puller, and the control circuitry may move the contact structure of each of the contour units based on the position information stored in the memory.

According to the above disclosure, the control circuitry can easily move the contact structures of the contour units.

In the above disclosure, the contact structure of each of the contour units may be a contour roller that moves on the thin-walled part or a contour board that comes into surface contact with the thin-walled part.

According to the above disclosure, the contour roller can be brought into contact with a region of the thin-walled part where sliding movement on the thin-walled part is relatively dominant when the load including a force component acting in the circumferential direction is applied to the thin-walled part, and the contour board can be brought into surface contact with another region of the thin-walled part where the sliding movement is not so dominant during the load application.

In the above disclosure, a wall thickness of the thin-walled part may be $1/3500$ or more of a maximum width of a hollow interior of the thin-walled part on an outer circumference of the mold.

According to the above disclosure, the thin-walled part can be properly demolded even when the wall thickness of the thin-walled part is small.

Many modifications and other embodiments of the present disclosure will be apparent to those skilled in the art from the foregoing description. Accordingly, the foregoing description is to be construed as illustrative only, and is provided for the purpose of teaching those skilled in the art the best mode for carrying out the disclosure. The details of the structure and/or function may be varied substantially without departing from the scope of the disclosure.

What is claimed is:

1. A demolding device that removes a thin-walled part from a mold, the thin-walled part being tubular and having a partially open wall, the demolding device comprising:
contour structures that are located in a circumferential direction of the thin-walled part and each of the contour structures includes a contact structure that contacts an outer surface of the thin-walled part and moves in a thin-walled surface outward direction extending away from the outer surface of the thin-walled part; and
a puller that engages with edges of the partially open wall of the thin-walled part and that applies a load to the thin-walled part, the load including a force component acting in the circumferential direction of the thin-walled part, wherein
in response to application of the load from the puller to the thin-walled part, each of the contour structures moves the contact structure to keep the contact structure in contact with the thin-walled part.

2. The demolding device according to claim 1, wherein the edges of the partially open wall of the thin-walled part include a first edge and a second edge that are opposite to each other in a horizontal direction,
the puller includes
a pair of engagers that engage with the first edge and the second edge of the thin-walled part, and
an actuator that moves the engagers, and
the puller moves the engagers by operation of the actuator to apply the load to the thin-walled part.

3. The demolding device according to claim 2, further comprising control circuitry that controls the puller and the contour structures, wherein
the control circuitry controls an amount of movement of the contact structure of each of the contour structures in conjunction with application of the load from the puller to the thin-walled part.

4. The demolding device according to claim 3, further comprising a memory storing position information specifying positions of the contour structures in association with a position of the puller, wherein
the control circuitry moves the contact structure of each of the contour structures based on the position information stored in the memory.

5. The demolding device according to claim 2, wherein the contact structure of each of the contour structures is a contour roller that moves on the thin-walled part or a contour board that comes into surface contact with the thin-walled part.

12

6. The demolding device according to claim 2, wherein a wall thickness of the thin-walled part is ⅓₅₀₀ or more of a maximum width of a hollow interior of the thin-walled part on an outer circumference of the mold.

7. The demolding device according to claim 1, further comprising control circuitry that controls the puller and the contour structures, wherein
the control circuitry controls an amount of movement of the contact structure of each of the contour structures in conjunction with application of the load from the puller to the thin-walled part.

8. The demolding device according to claim 7, further comprising a memory storing position information specifying positions of the contour structures in association with a position of the puller, wherein
the control circuitry moves the contact structure of each of the contour structures based on the position information stored in the memory.

9. The demolding device according to claim 8, wherein the contact structure of each of the contour structures is a contour roller that moves on the thin-walled part or a contour board that comes into surface contact with the thin-walled part.

10. The demolding device according to claim 8, wherein a wall thickness of the thin-walled part is ⅓₅₀₀ or more of a maximum width of a hollow interior of the thin-walled part on an outer circumference of the mold.

11. The demolding device according to claim 7, wherein the contact structure of each of the contour structures is a contour roller that moves on the thin-walled part or a contour board that comes into surface contact with the thin-walled part.

12. The demolding device according to claim 7, wherein a wall thickness of the thin-walled part is ⅓₅₀₀ or more of a maximum width of a hollow interior of the thin-walled part on an outer circumference of the mold.

13. The demolding device according to claim 1, wherein the contact structure of each of the contour structures is a contour roller that moves on the thin-walled part or a contour board that comes into surface contact with the thin-walled part.

14. The demolding device according to claim 13, wherein a wall thickness of the thin-walled part is ⅓₅₀₀ or more of a maximum width of a hollow interior of the thin-walled part on an outer circumference of the mold.

15. The demolding device according to claim 1, wherein a wall thickness of the thin-walled part is ⅓₅₀₀ or more of a maximum width of a hollow interior of the thin-walled part on an outer circumference of the mold.

16. The demolding device according to claim 1, wherein the edges of the partially open wall of the thin-walled part include a first edge and a second edge that are opposite to each other in a horizontal direction.

* * * * *